(12) United States Patent
Baldwin

(10) Patent No.: US 9,763,434 B2
(45) Date of Patent: Sep. 19, 2017

(54) FISHING REEL HAVING OPENABLE SIDE COVER

(71) Applicant: DQC International Corp., Inc., Tampa, FL (US)

(72) Inventor: Matt Baldwin, Palm Harbor, FL (US)

( * ) Notice: Subject to any disclaimer, the term of this patent is extended or adjusted under 35 U.S.C. 154(b) by 236 days.

(21) Appl. No.: 14/723,682

(22) Filed: May 28, 2015

(65) Prior Publication Data

US 2016/0345562 A1 Dec. 1, 2016

(51) Int. Cl.
*A01K 89/01* (2006.01)
*A01K 89/015* (2006.01)

(52) U.S. Cl.
CPC .............. *A01K 89/01922* (2015.05)

(58) Field of Classification Search
CPC ............ A01K 89/015; A01K 89/01922; A01K 89/01923
See application file for complete search history.

(56) References Cited

U.S. PATENT DOCUMENTS

| | | | |
|---|---|---|---|
| 5,370,331 A * | 12/1994 | Sato | A01K 89/015 242/313 |
| 5,386,948 A * | 2/1995 | Sato | A01K 89/015 242/313 |
| 5,558,290 A | 9/1996 | Sato | |
| 5,839,682 A * | 11/1998 | Kim | A01K 89/015 242/314 |
| 5,873,535 A * | 2/1999 | Jeung | A01K 89/015 242/310 |
| 6,460,793 B1 * | 10/2002 | Hirayama | A01K 89/015 242/313 |
| 6,634,587 B2 | 10/2003 | Fleming | |
| 6,726,137 B1 | 4/2004 | Li | |
| 6,857,589 B2 | 2/2005 | Kitajima | |
| 7,070,136 B1 | 7/2006 | Nakagawa | |
| 7,070,139 B2 * | 7/2006 | Nakagawa | A01K 89/015 242/313 |
| 7,350,730 B2 * | 4/2008 | Hyun | A01K 89/015 242/310 |
| 2013/0320125 A1 * | 12/2013 | Hyun | A01K 89/015 242/312 |
| 2014/0158803 A1 | 6/2014 | Hyun | |

* cited by examiner

*Primary Examiner* — Emmanuel M Marcelo
(74) *Attorney, Agent, or Firm* — Maxey-Fisher, PLLC; Stephen Lewellyn

(57) ABSTRACT

A reel includes a reel body that has opposite first and second ends and a reel body opening at the second end. A line guide support shaft is affixed to the reel body and extends between the first and second ends and defines a bore extending through a first end that is approximate the second end of the reel body. A shaft is disposed within the bore for reciprocation and rotation within the bore. A side cover is affixed to shaft for conjoint movement therewith between open and closed positions, wherein in the closed position the side cover is engaged with the second end of the reel body and closes the reel body opening, and wherein is the open position the side cover is disengaged from the second end of the reel body and the reel body is open.

12 Claims, 5 Drawing Sheets

FISHING REEL HAVING OPENABLE SIDE COVER

FIELD OF THE INVENTION

The present invention relates generally to baitcasting fishing reels, and more particularly to a baitcasting fishing reel including an openable side cover for giving access to the interior of the reel.

BACKGROUND OF THE INVENTION

Baitcasting fishing reels having an openable side cover currently exist. An Example of such a reel is described by Sato in U.S. Pat. No. 5,370,331; and by Nakagawa et al. in U.S. Pat. No. 7,070,139, each of which are incorporated herein in their entirety by reference. Conventionally, the openable side cover allows access to the reel for servicing or adjusting the reel, or to remove the spool, for example.

While the baitcasting fishing reels having an openable side covers existing before now meet their respective requirements and objectives, a need remains for a new design with improved reliability and a compact construction.

SUMMARY OF THE INVENTION

In a general aspect, a baitcasting fishing reel includes a side cover moveably attached to a body of the fishing reel to selectively close a reel body opening that provides access to components of the reel disposed within the reel body.

In general, in one aspect, a reel with an openable side cover is provided. The reel includes a reel body that has opposite first and second ends and a reel body opening at the second end. A line guide support shaft is affixed to the reel body and extends between the first and second ends. The line guide support shaft defines a bore extending through a first end that is approximate the second end of the reel body. A shaft is disposed within the bore for reciprocation and rotation within the bore. The shaft has a first and second ends, the first end being disposed inwardly of the bore and the second end being disposed outwardly of the bore. A side cover is affixed to shaft for conjoint movement therewith between open and closed positions, wherein in the closed position the side cover is engaged with the second end of the reel body and closes the reel body opening, and wherein is the open position the side cover is disengaged from the second end of the reel body and the reel body is open.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there are illustrated embodiments of the invention.

BRIEF DESCRIPTION OF THE DRAWINGS

The following drawings illustrate by way of example and are included to provide further understanding of the invention for the purpose of illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature of a feature with similar functionality. In the drawings.

DETAILED DESCRIPTION OF THE INVENTION

Figure 1:
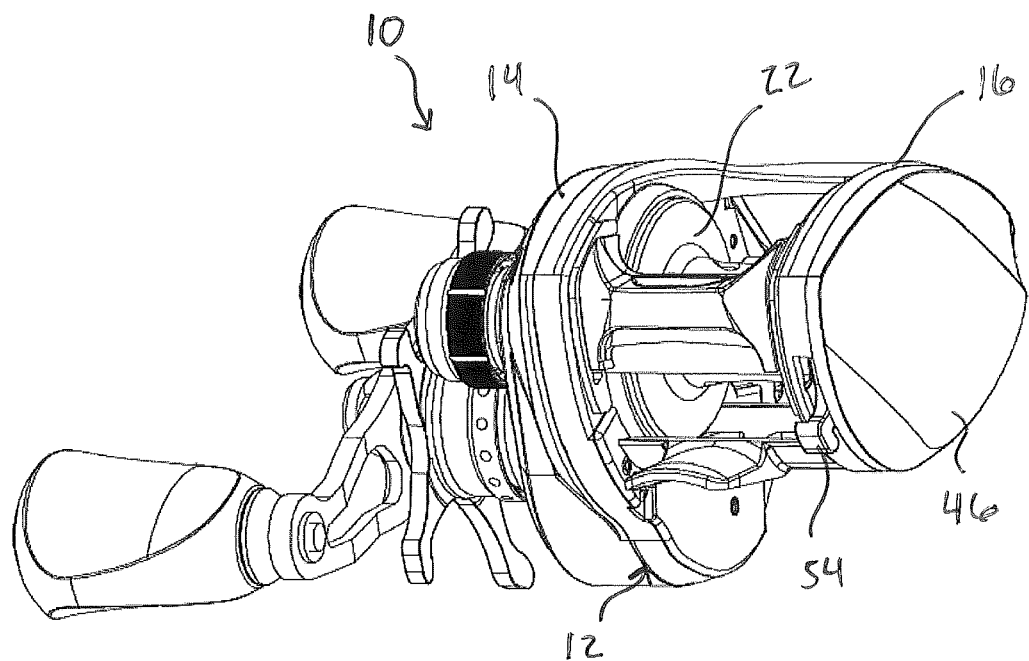
FIG. 1 is a perspective view of a reel having an openable side cover constructed in accordance with an embodiment of the present invention, showing the side cover in a closed position.

Referring to FIGS. 1-9, a baitcasting reel 10 includes a reel body 12 having opposite first and second sides 14 and 16, respectively and an opening 18 at the second side. Opening 18 permits access to the interior of the reel 10 to service or adjust the reel and its components, such as reel braking system 20 (FIG. 6), for example.

Reel 10 further includes a spool 22 that is carried by the reel body 12 and is supported by spool shaft 24 for rotation to wind and unwind line (not shown) upon the spool. When in use, line is threaded through a line guide 26, which is driven in a back-and-forth in a direction across the spool by a helical drive 28 to proportionally distribute the line upon the spool. The line guide 26 is supported by a line guide support shaft 30 that is affixed to the reel body 12 and extends across the reel body between the first and second ends 14 and 16, and upon which the line guide moves back-and-forth.

Figure 9:
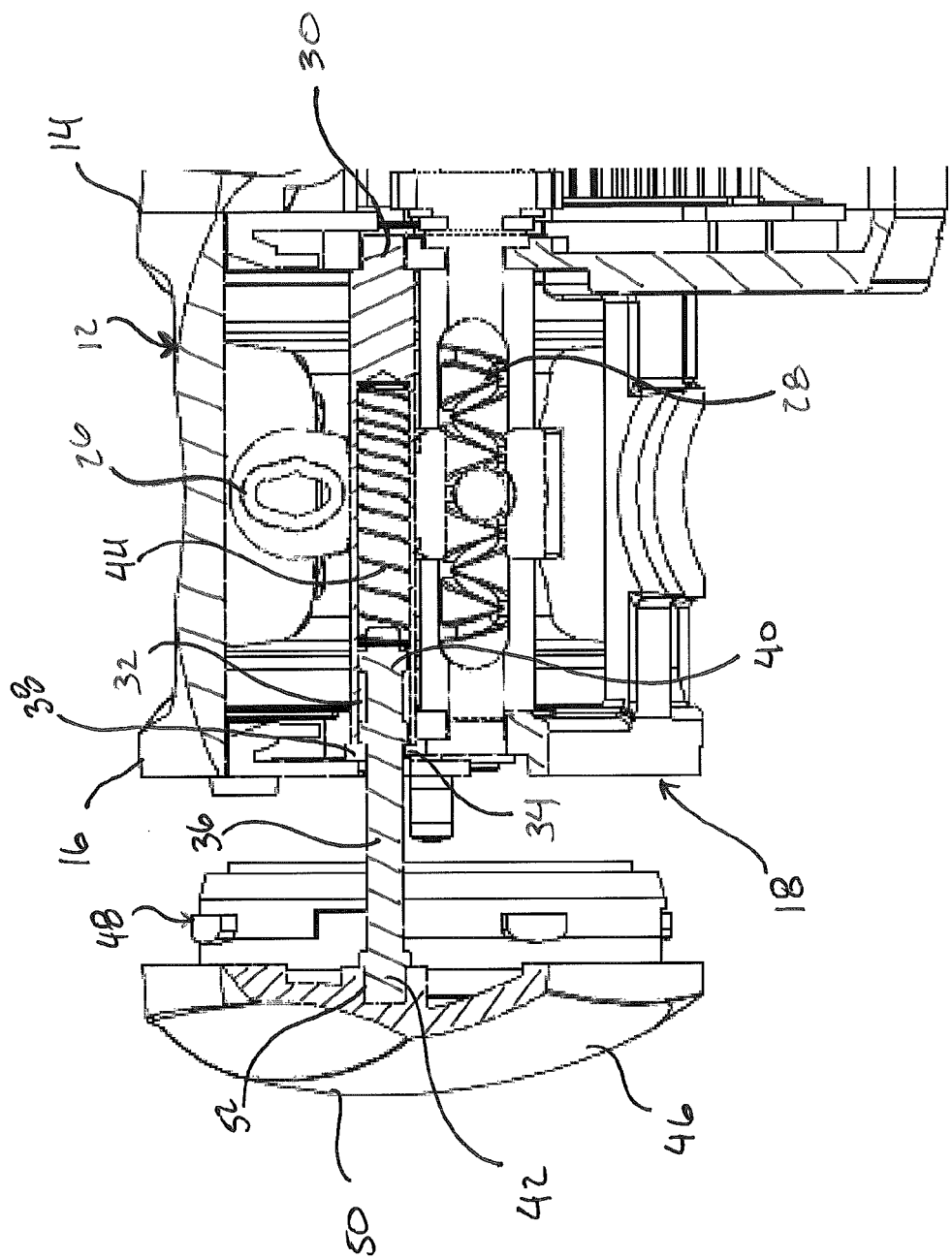
FIG. 9 is an enlarged, partial cross-sectional view of a reel having an openable side cover constructed in accordance with an embodiment of the present invention.

As best seen in FIG. 9, line guide support shaft 30 includes blind bore 32 formed through end 34 located at the second side 16 of the reel body 12. A shaft 36 is disposed within bore 32 for reciprocation and rotation therein and relative to the line guide support shaft 30. Shaft 36 is captively held in bore 32, for example, by clip 38 such that the shaft 36 cannot be completely withdrawn from the bore. In an aspect, shaft 36 is a solid shaft having a fixed length (i.e., not telescopic). Shaft 36 is positionable between extended and retracted positions. In FIG. 9, shaft 36 is shown in the fully extend position with its first end 40 retained within the bore and with its second end 42 terminating at a spaced distance from the second end 16 of the reel body 12. In contrast, in FIG. 3, shaft 36 is shown in the fully retracted position where its second end 42 is disposed more closely to the second end 16 of the reel body 12 than it is in the extended position.

Shaft 36 may be spring biased into the extended position by a spring 44 that is captively disposed within the bore 32 and between the bore and the first end 36 of the shaft. As shown, spring 44 is a coil spring that urges against the shaft 36 to bias the shaft into the extended position.

Figure 3:
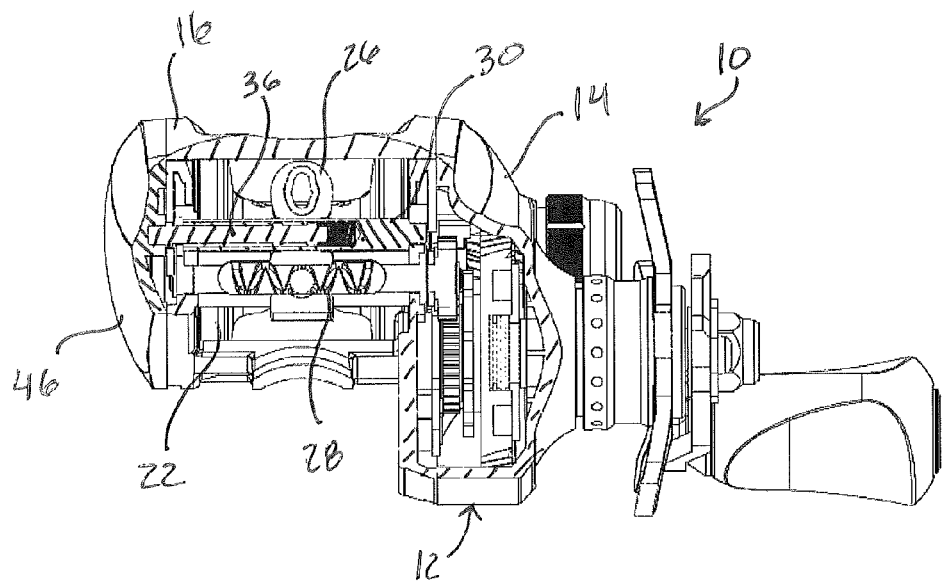
FIG. 3 is a partial cross-sectional view of the reel of FIG. 1.
Figure 8:
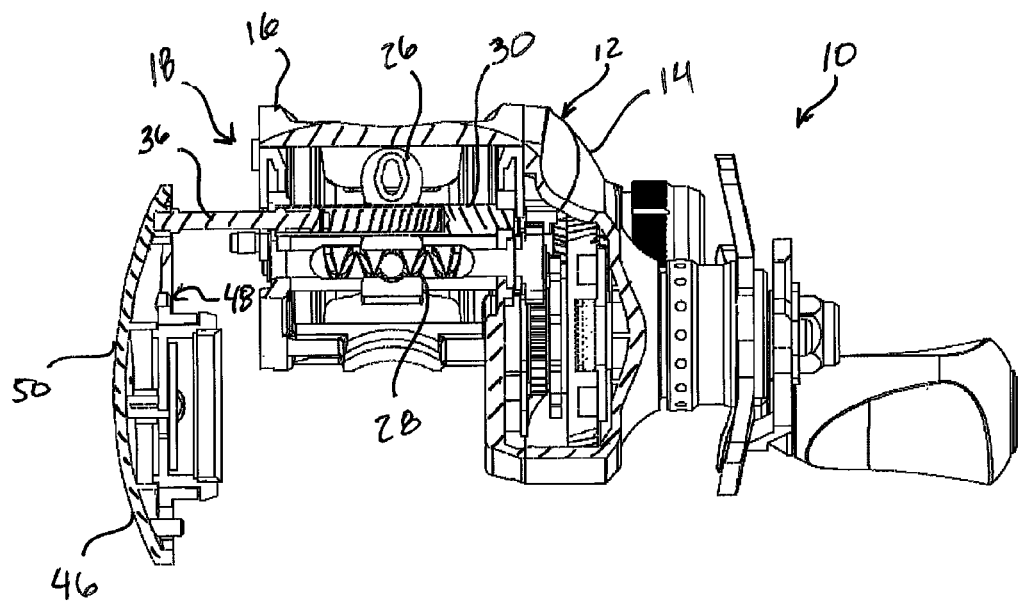
FIG. 8 is a partial cross-sectional view of the reel of FIG. 6.

Reel 10 further includes a side cover 46 for closing the reel body opening 18. The side cover is moveably connected to the reel body 12 for positioning between open and closed positions. When the side cover 46 is in the open position the reel body opening 18 is open and accessible. And when the side cover 46 is in the closed position the reel body opening 18 is closed an inaccessible. In FIG. 3, the side cover 46 is shown in the closed position where the reel body opening 18 is sealed by the cover. In FIG. 8, the side cover 46 is shown in the open position where the side cover 46 is displaced from the reel body 12 and the reel body opening 18 is open an accessible.

The side cover 46 includes an inward facing side 48 that is configured to mate with the second side 16 of the reel body 12 when the side cover is in the closed position, thereby closing the reel body opening 18. Its opposite, outward facing side 50 is generally decorative and provides a finished appearance to the reel body 12 when the side cover 46 is positioned in the closed position, as best seen in FIG. 1.

Figure 6:
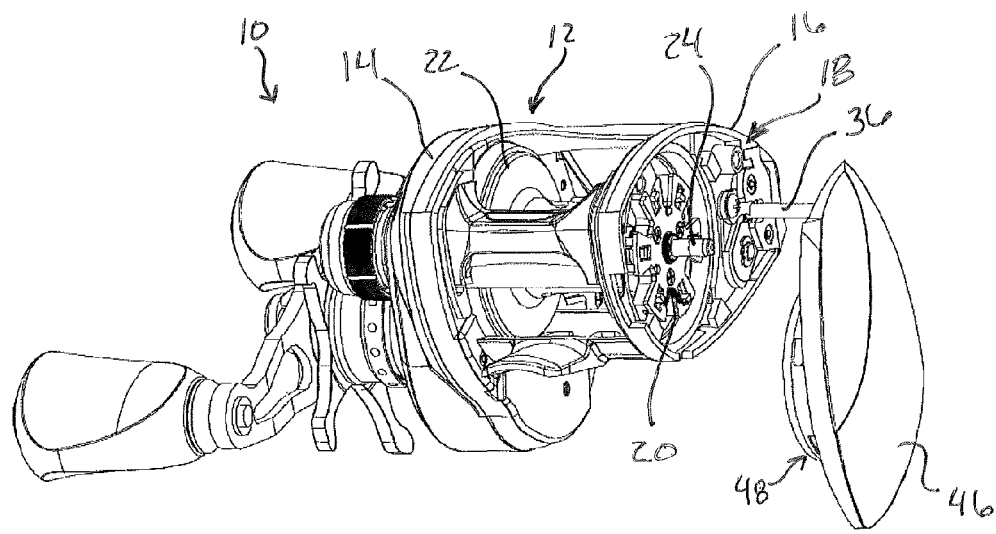
FIG. 6 is a perspective view of a reel having an openable side cover constructed in accordance with an embodiment of the present invention, showing the side cover in an open position.
Figure 7:
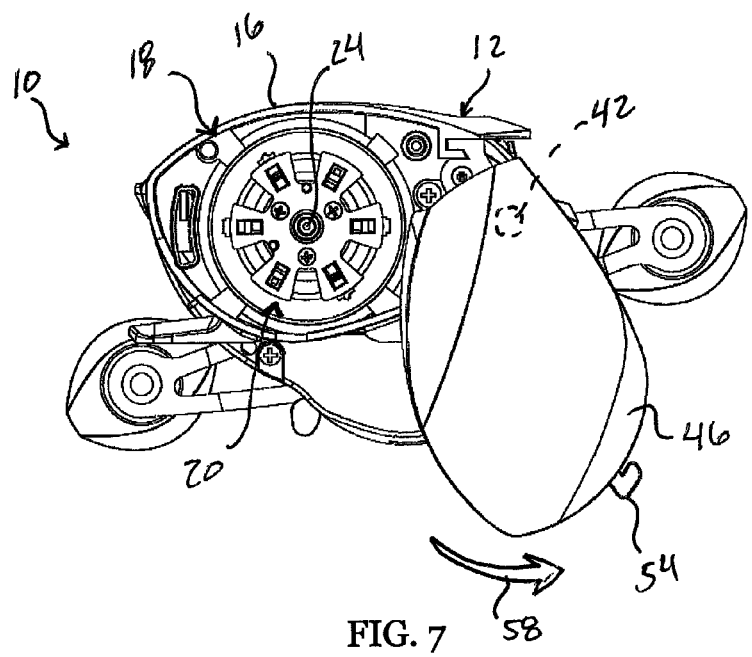
FIG. 7 is a side elevation view of the reel of FIG. 6.

The side cover 46 is moveably connected to the reel body by shaft 36, which allows the side cover to move outwardly from the second end 16 of the reel body 12, and then to rotate relative to the reel body, as best seen in FIGS. 6 and 7, to provide access to the reel body opening 18. Particularly, the side cover 46 is fixedly connected to shaft 36 for conjoint movement therewith by end 42 of the shaft being received within a recess or bore 52 on the inward facing side 48 of the side cover.

A latch mechanism 54 engages with the reel body 12 and secures the side cover 46 in the closed position, sealing the reel body opening 18. Operation of the latch mechanism 54 disengages it from the reel body 12 and permits the side cover 46 to be moved away from the reel body to open reel body opening 18. Afterward, the side cover 46 is moved back into the closed position, the latch mechanism 54 is reengaged with the reel body 12, thereby securing the side cover to the reel body and closing the opening. The latch mechanism 54 is located in a position on the side cover 46 that permits one-handed operation of the latch mechanism and opening the side cover.

Figure 2:
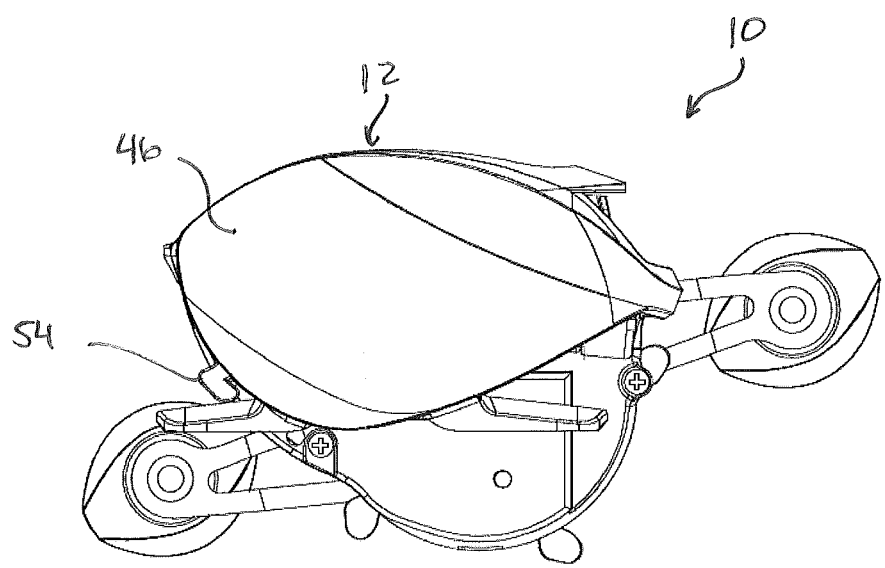
FIG. 2 is a side elevation view of the reel of FIG. 1.
Figure 4:
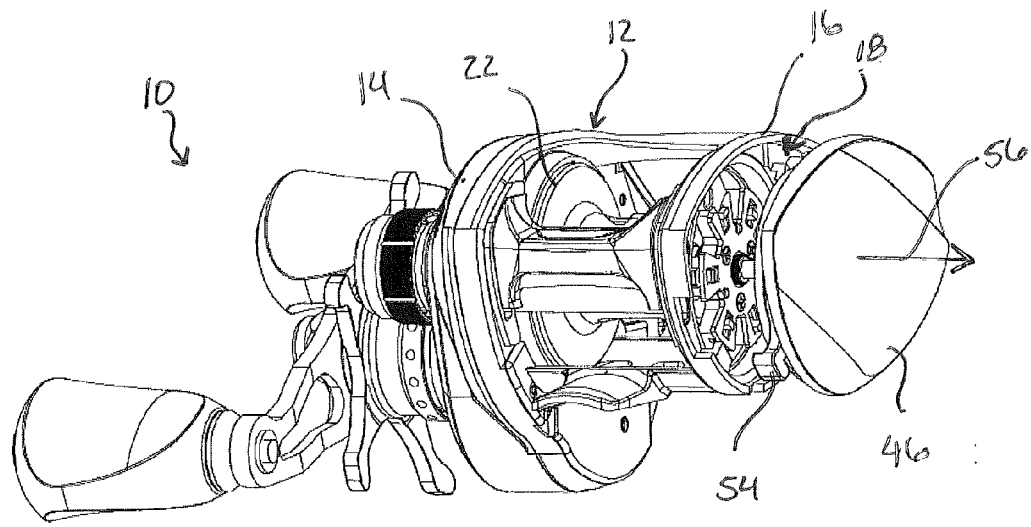
FIG. 4 is a perspective view of a reel having an openable side cover constructed in accordance with an embodiment of the present invention, showing the side cover in an intermediate open position.
Figure 5:
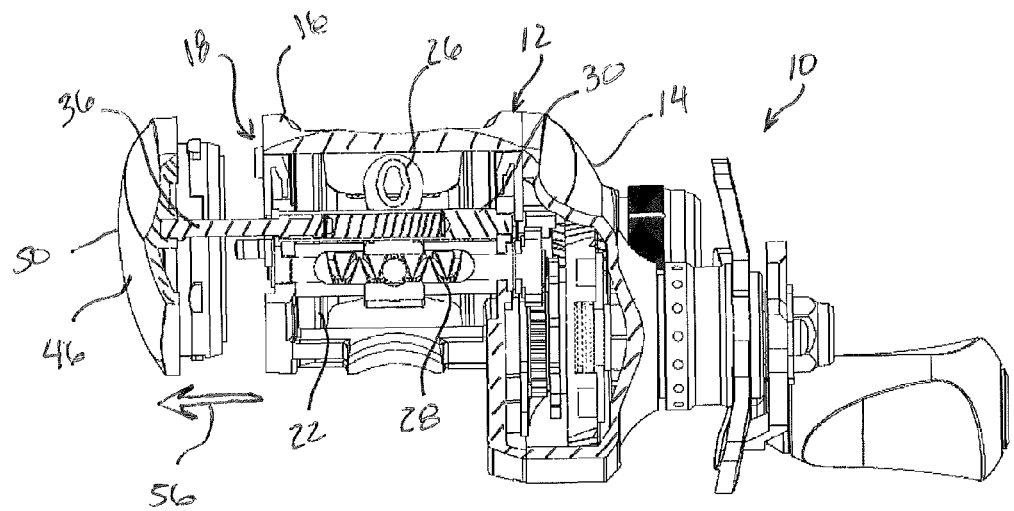
FIG. 5 is a partial cross-sectional view of the reel of FIG. 4.

Finally, with reference to FIGS. 1-3, the side cover 46 is shown in the closed position and secured to the reel body 12 by latch mechanism 54, thereby closing the reel body opening 18. In FIGS. 4 and 5, the side cover 46 is shown in an intermediate position between the closed position and fully open position, wherein the latch mechanism 54 has been disengaged and the side cover moved outwardly from the reel body 12 along direction 56. In FIGS. 6-8, the side cover 46 is shown in the open position, where shaft 36 is fully extended outward in direction 56 and the side cover is rotated away from the reel body opening 18 in direction 58 allowing access to reel components through the reel body opening.

One or more specific embodiments of the disclosed and claimed invention have been described in detail. Nevertheless, it will be understood that various modifications may be made without departing from the spirit and scope of the disclosure. Accordingly, other implementations are within the scope of the following claims.

What is claimed is:

1. A reel having an openable side cover, the reel comprising:
   a reel body having opposite first and second ends and a reel body opening at said second end;
   a line guide support shaft affixed to said reel body and extending between said first and second ends, said line guide support shaft defining a bore extending through a first end that is approximate said second end of said reel body;
   a shaft disposed within said bore for reciprocation and rotation therewithin, said shaft having a first and second ends, said first end being disposed inwardly of said bore and said second end being disposed outwardly of said bore; and
   a side cover affixed to said shaft for conjoint movement therewith between open and closed positions, wherein in said closed position said side cover is engaged with said second end of said reel body and closes said reel body opening, and wherein in said open position said side cover is disengaged from said second end of said reel body and said reel body is open.

2. The reel of claim 1, further comprising:
   a spring disposed within said bore and biasing against said shaft.

3. The reel of claim 1, further comprising:
   a latch mechanism securing said side cover in said closed position.

4. The reel of claim 1, wherein said shaft is captively held in said bore to prevent said shaft from complete withdrawal from said bore.

5. The reel of claim 1, wherein said side cover includes an inward facing side and an outward facing side, and wherein said shaft is affixed to said inward facing side.

6. The reel of claim 1, further comprising a reel braking system.

7. The reel of claim 1, wherein said shaft is solid and of a fixed length.

8. The reel of claim 1, wherein said bore is a blind bore.

9. A reel having an openable side cover, the reel comprising:
   a reel body having opposite first and second ends and a reel body opening at said second end;
   a line guide support shaft affixed to said reel body and extending between said first and second ends, said line guide support shaft defining a blind bore extending through a first end that is approximate said second end of said reel body;
   a shaft disposed within said bore for reciprocation and rotation therewithin, said shaft being solid, of a fixed length, and having a first and second ends, said first end being disposed inwardly of said bore and said second end being disposed outwardly of said bore;

a spring disposed within said bore and biasing against said shaft;

a side cover having inward and outward facing sides, said cover affixed to said shaft for conjoint movement therewith between open and closed positions, wherein in said closed position said side cover is engaged with said second end of said reel body and closes said reel body opening, and wherein in said open position said side cover is disengaged from said second end of said reel body and said reel body is open; and a latch mechanism securing said side cover in said closed position.

10. The reel of claim 9, wherein said shaft is captively held in said bore to prevent said shaft from complete withdrawal from said bore.

11. The reel of claim 10, wherein said shaft is affixed to said inward facing side.

12. The reel of claim 11, further comprising a reel braking system.

* * * * *